US006959739B2

(12) United States Patent
Linnér

(10) Patent No.: US 6,959,739 B2
(45) Date of Patent: Nov. 1, 2005

(54) TUBE-FILLING MACHINE AND A FILLING METHOD IN SUCH A MACHINE

(75) Inventor: Hans Linnér, Kalmar (SE)

(73) Assignee: Norden Pac Development AB (SE)

( * ) Notice: Subject to any disclaimer, the term of this patent is extended or adjusted under 35 U.S.C. 154(b) by 0 days.

(21) Appl. No.: 10/498,210

(22) PCT Filed: Nov. 19, 2002

(86) PCT No.: PCT/SE02/02096

§ 371 (c)(1),
(2), (4) Date: Jan. 13, 2005

(87) PCT Pub. No.: WO03/062059

PCT Pub. Date: Jul. 31, 2003

(65) Prior Publication Data

US 2005/0115208 A1 Jun. 2, 2005

(30) Foreign Application Priority Data

Dec. 11, 2001 (SE) .............................................. 0104166

(51) Int. Cl.⁷ ................................................ B65B 1/04
(52) U.S. Cl. ........................... 141/9; 141/100; 141/114; 141/275; 53/469
(58) Field of Search .............................. 141/1, 392, 9, 141/100, 148, 165, 172, 275, 276, 114, 10, 313; 53/410, 469, 474

(56) References Cited

U.S. PATENT DOCUMENTS 1,676,734 A   7/1928  Hopkins 3,881,529 A   5/1975  Mannara
6,382,265 B2 * 5/2002  Weckerle ........................ 141/9

FOREIGN PATENT DOCUMENTS

DE   1 185 981 B1   1/1965
GB   2 142 611 A1   1/1985

* cited by examiner

Primary Examiner—Steven O. Douglas
(74) Attorney, Agent, or Firm—Lerner, David, Littenberg, Krumholz & Mentlik, LLP

(57) ABSTRACT

Methods for filing tubes having inner and outer tubes separated by a predetermined gap are provided including delivering the tube to a tube filling station, filling the predetermined gap at the tube filling station by centering the outer tube with respect to an elongated nozzle including a plurality of filling pipes corresponding to the predetermined gap and a mandrel for insertion into the inner tube by means of a centering sleeve disposed externally around the elongated nozzle to provide the outer tube with a nominal cross sectional shape and centering the inner tube with respect to the elongated nozzle by means of the mandrel disposed within the inner tube to provide the inner tube with its nominal cross sectional shape, positioning the elongated nozzle proximate to a common tube shoulder at the first end of the tube connecting the inner tube to the outer tube, filling the predetermined gap with the plurality of filling tubes while guiding the elongated nozzle out of the second end of the tube while retaining the centering sleeve around the elongated nozzle and filling the inner tube. Apparatus for carrying out this method is also disclosed.

8 Claims, 3 Drawing Sheets

TUBE-FILLING MACHINE AND A FILLING METHOD IN SUCH A MACHINE

FIELD OF THE INVENTION

The present invention relates to tube-filling machines and to filling methods using such machines. More precisely, the present invention relates to the filling of double tubes. This means a tube of the type which has an inner tube and an outer tube separated by a gap, and both connected to a common tube shoulder which has means for delivering product from the inner tube and the outer tube through an emptying opening in a desired way.

BACKGROUND OF THE INVENTION

Double tubes of the above-described type, as well as other types of two-chamber or multi-chamber tubes are used, for example, for packing different types of products or components which, on mutual contact, react easily with one another, either chemically or in some other way. It is desirable that such reaction occurs only in connection with the contents, in portions or completely, being emptied from the tube. Under such conditions, the components therefore have to be stored separately in the tube.

Applications other than that mentioned above also exist. A double tube or other multi-chamber tube can be used, for example, to deliver "striped toothpaste".

U.S. Pat. No. 1,676,734 discloses an early approach of sequentially filling inner- and outer tubes of a double tube.

For rapid and reliable processing of such double tubes, however, an effective filling step and thus a commercially competitive tube-filling machine are lacking at present.

Such a tube-filling machine is to be capable of being used, with precision and high capacity, for producing defect-free, filled tubes without operational stoppages of the machine as a consequence of, for example, contamination in connection with filling, poor sealing of filled tubes or other hitches which disrupt functioning.

In order to achieve high output capacity, it is also to be possible when necessary for the filling, to carry out the filling in a parallel manner with a large number of tubes simultaneously in the filling station.

Double tubes of the type mentioned above have previously caused major problems, and it has not been possible to effectively fill such tubes in tube-filling machines without encountering the disruptions mentioned above.

One object of the present invention is to therefore eliminate this disadvantage and to provide an effective filling process and a tube-filling machine for the double tubes.

SUMMARY OF THE INVENTION

In accordance with the present invention, this and other objects have now been realized by the discovery of a method for filling tubes having a first end having a delivery opening and a second end and including an inner tube, an outer tube separated from the inner tube by a predetermined gap, and a common tube shoulder at the first end of the tube connecting the inner tube to the outer tube for delivering product from the inner and outer tubes to the delivery opening, the method comprising delivering the tube to a tube filling station along a conveyor path, filling the predetermined gap at the tube filling station by means of an elongated nozzle including a plurality of filling pipes corresponding to the predetermined gap and a mandrel for insertion into the inner tube, the filling step comprising centering the outer tube with respect to the elongated nozzle by means of a centering sleeve disposed externally around the elongated nozzle to provide the outer tube with its nominal cross-sectional shape and centering the inner tube with respect to the elongated nozzle by means of the mandrel disposed within the inner tube to provide the inner tube with its nominal cross-sectional shape, positioning the elongated nozzle proximate to the common tube shoulder, filling the predetermined gap with the plurality of filling tubes while guiding the elongated nozzle out of the second end of the tube while retaining the centering sleeve around the elongated nozzle, and filling the inner tube. Preferably, the method includes controlling relative movement between the elongated nozzle and the tube by supporting the elongated nozzle in a machine frame supporting a holder for vertical movement of the elongated nozzle and vertically moving the centering sleeve, and synchronizing the movement of the centering sleeve with the movement of the tube holder. In a preferred embodiment, the method includes positioning the plurality of filling pipes with essentially uniform spacing around the periphery of the mandrel. In accordance with one embodiment of the method of the present invention, both the inner tube and the outer tube have a circular-cylindrical shape along the majority of the distance from the first end to the second end thereof.

In accordance with the present invention, tube filling apparatus has been discovered for filling tubes having a first end having a delivery opening and a second end and including an inner tube, an outer tube separated from the inner tube by a predetermined gap, and a common tube shoulder at the first end of the tube connecting the inner tube to the outer tube for delivering product from the inner and outer tubes to the delivery opening, the apparatus comprising a conveyor for delivering the tube to a filling station along a conveyor path, the filling station comprising an elongated nozzle for insertion into the predetermined gap, the elongated nozzle including a mandrel for insertion into the inner tube and a plurality of filling pipes for insertion into the predetermined gap, a centering sleeve disposed around the elongated nozzle, moving means for moving the tube with respect to the elongated nozzle, and holding means for maintaining the centering sleeve in position around the second end of the tube during relative movement between the tube and the elongated nozzle. Preferably, the moving means comprises a vertically movable tube holder, a stand supporting the moving means including servo controls, the elongated nozzle being supported in a positionally fixed manner in the stand, and the holding means comprising a servo driven unit synchronized with the servo controls. In a preferred embodiment, the plurality of filling pipes are positioned essentially uniformly in a spaced array around the periphery of the mandrel. In a particularly preferred embodiment, the elongated nozzle is substantially circular-cylindrical, and the plurality of filling pipes lie within the lateral surface of the elongated nozzle, the mandrel being essentially cylindrical and including a conical entry end.

BRIEF DESCRIPTION OF THE DRAWINGS

In order to more fully appreciate the nature of the present invention, reference is made to the following detailed description, which in turn refers to the accompanying drawings which show a number of basic and detailed illustrations of major structural elements forming part of the tube-filling machine for realization of the abovementioned objects, in which drawings.

DETAILED DESCRIPTION

Figure 1:
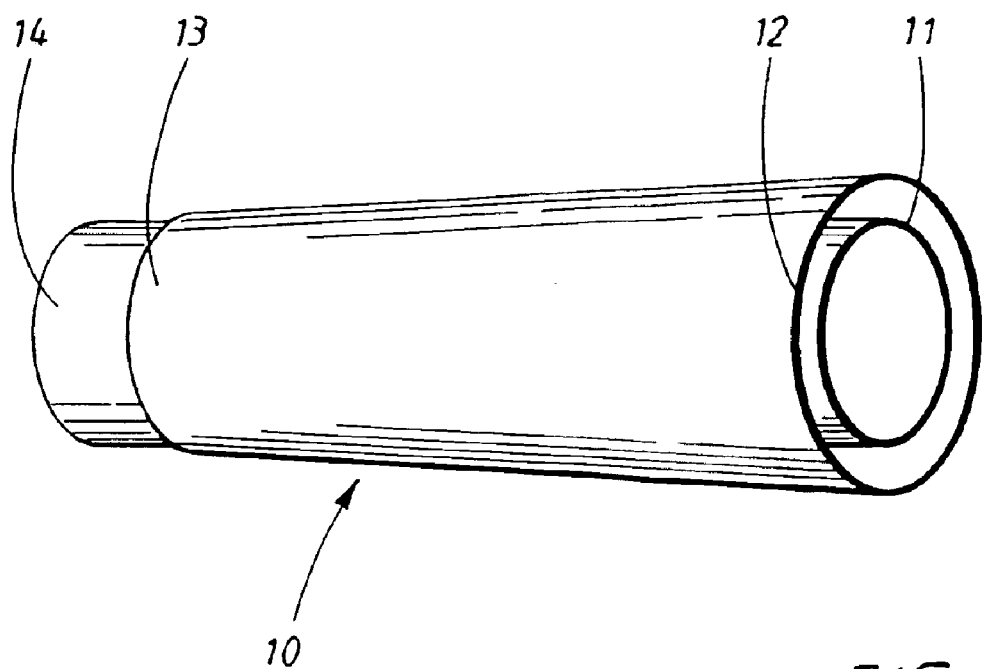
FIG. 1 is a side, perspective, view of a double tube before insertion into the tube-filling machine according to the present invention.

The double tube 10 shown in FIG. 1 has an inner tube 11 and an outer tube 12. These two tubes are connected to a tube shoulder 13, in which there are passages (not shown) for separate dispensing and subsequent mixing of the contents of the inner tube 11 and the gap-shaped space between the inner tube and the outer tube. There is a tube cap 14 on the tube shoulder.

In the embodiment shown, the inner tube, the outer tube 11, the tube shoulder 13, and the tube cap 14, all have a circular cross section, which is to be preferred with the filling step which will be described below.

In principle, however, other cross-sectional shapes are possible.

The selection of material for the double tube components depends on the intended application. Thermoplastics of the polyolefin type, for example polyethylene, polypropylene, etc. with or without a barrier layer, are usually used. In order to apply the hot-gas activation technique and heat-sealing method which are described in co-pending divisional Swedish Patent Application No. 0203294-4, however, it is essential that the open end portions of the double tube in FIG. 1 comprise material which is heat-sealable.

The double tube 10 is inserted into the tube-filling machine directly from transport packs filled with a large number of tubes and supplied by a tube manufacturer. The tubes can be greatly deformed and deviate considerably from their nominal (circular) cross section at the open end. The double tube shown in FIG. 1 intended for insertion into the tube-filling machine deviates moderately from the nominal cross section. In view of the fact, however, that the gap between the inner tube and the outer tube has a relatively small width, for example of the order of 5 mm, handling is inevitably a delicate operation, chiefly in connection with filling the gap space, but also during thermal activation for subsequent sealing.

Figure 2:
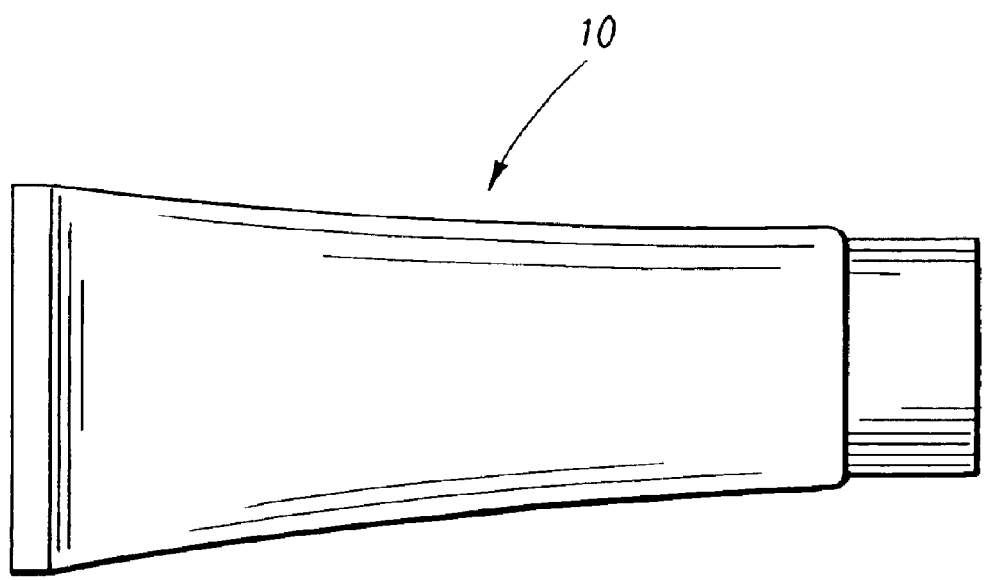
FIG. 2 is a side, elevational view of the double tube shown in FIG. 1 when it leaves the tube-filling machine.

It is yet another important task, with the narrow gap space and where appropriate different kinds of material are utilized in the inner tube and the outer tube, to bring about leakproof and aesthetically attractive end sealing of the double tube. Such end sealing can be seen in FIG. 2. A special thermal activation process for this important task is disclosed in the divisional Swedish patent application mentioned above.

Figure 3:
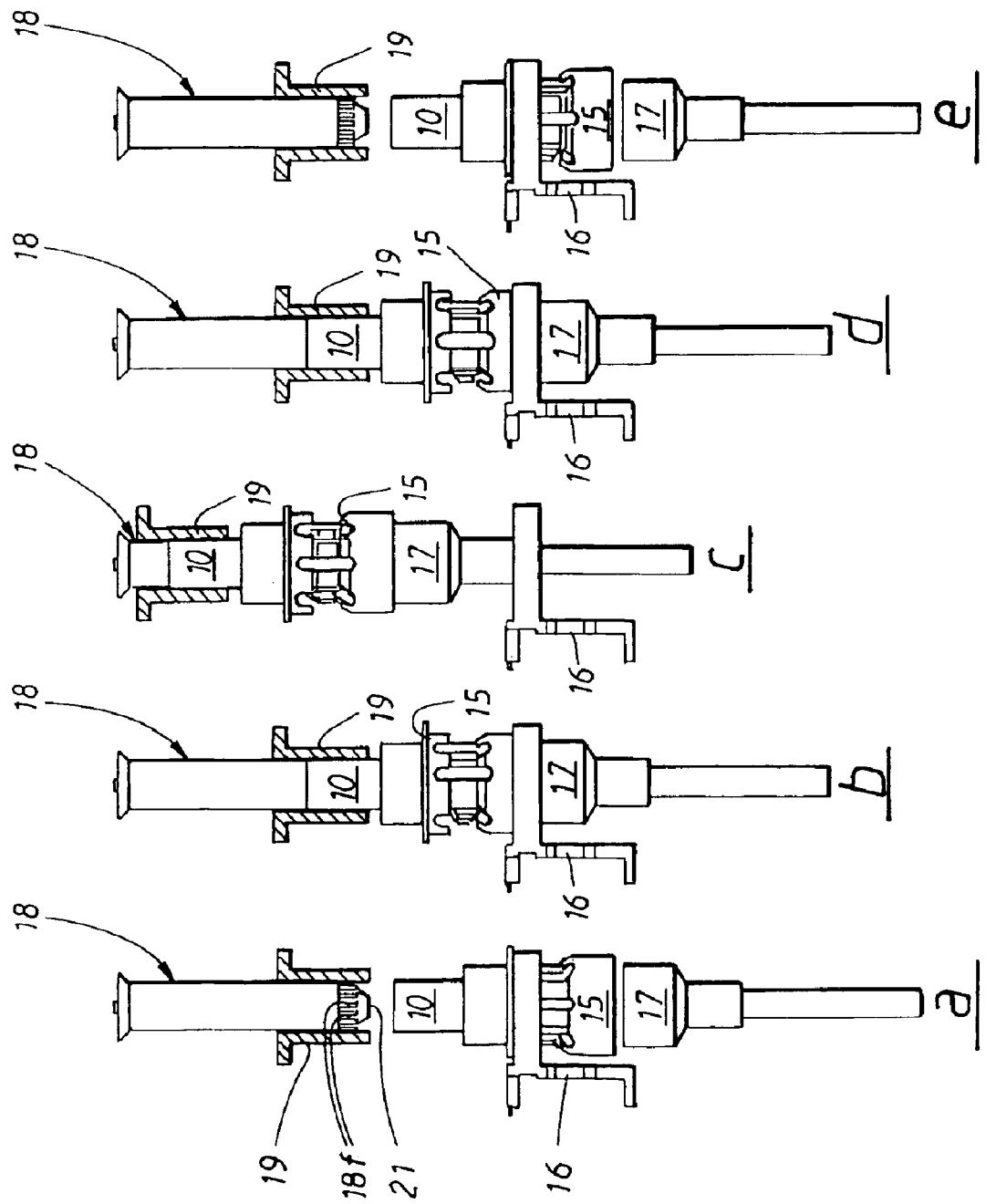
FIG. 3 is a side, elevational view of the processing steps of the method of the present invention for filling the gap-shaped space of the double tube between the inner tube and the outer tube.

FIG. 3 shows the processing steps according to the present invention for filling the gap-shaped space between the inner tube and the outer tube. The double tube 10 is supported in a tube holder 15. This is located on an endless conveyor 16 supported by a machine frame (not shown) and driven stepwise in order to convey tubes, individually or in groups, to work stations in order to process them.

A lifting device 17 is shown in the filling station in FIG. 3 and can be applied to the underside of the tube holder 15 in order to adjust the vertical position of the tube holder, and thus the tube, vertically upwards and downwards.

Located vertically above the tube 10 in FIG. 3 is a filling nozzle 18 which, in the embodiment shown, is supported in a stationary manner in the machine frame. A vertically upwardly and downwardly adjustable centering sleeve 19 of circular inner cross section surrounds the lateral surface of the elongated, cylindrical nozzle 18 with a gap which makes possible insertion of the end of the outer tube into the gap space. The inner cross section (which is circular in the embodiment shown) of the centering sleeve corresponds to the cross section of the end of the outer tube, and the cross section is intended to give this end its nominal cross section and dimension. By means of the centering sleeve, the requisite well-defined shape of the outer tube end is thus created and/or guaranteed from the outside of the double tube.

Figure 4:
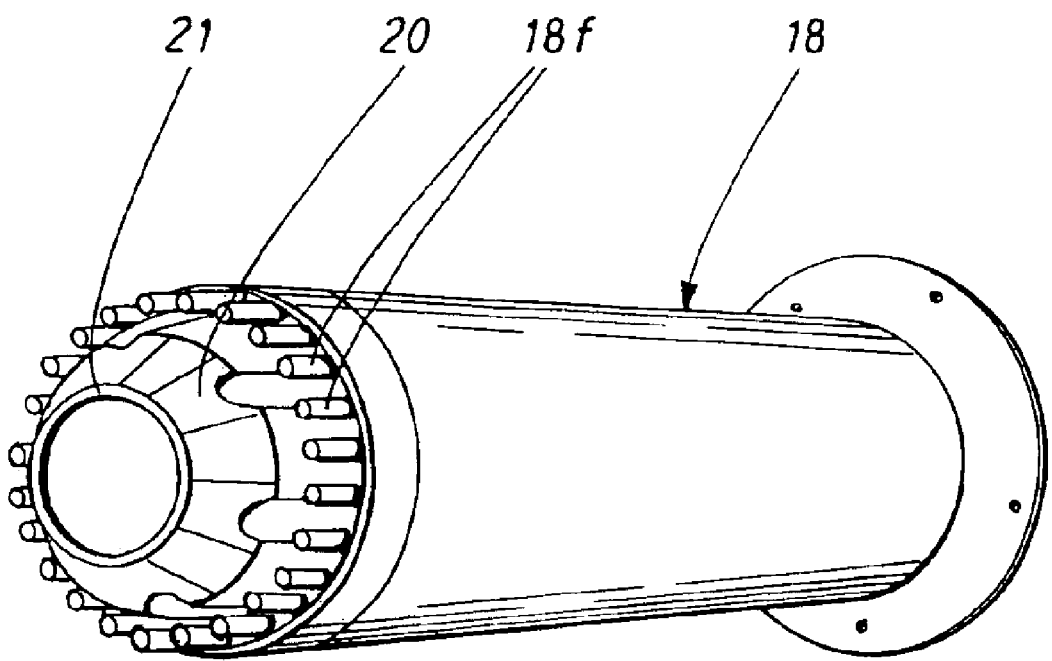
FIG. 4 is a front, perspective view of the filling nozzle for filling the gap-shaped space, in the double tube between the inner and outer tubes.

Before the processing steps shown in FIG. 3 are described, a more detailed description of the filling nozzle 18 is required, and reference is made to FIG. 4 in this regard.

The filling nozzle is elongated and has a circular-cylindrical outer lateral surface which, together with the centering sleeve 19, is intended to receive the outer tube 12 of the double tube between itself and the centering sleeve. Located slightly radially inside this lateral surface, with uniform mutual spacing along the entire periphery of the lateral surface, is a set of filling pipes 18f. The mouths of these pipes have a relatively small diameter, of the order of a few mm, a diameter which is obviously smaller than the gap width between the inner tube 11 and the outer tube 12 of the double tube. As mentioned previously, the space intended for filling between the inner tube and the outer tube is narrow, and it is essential that product is not accumulated on the outside of the filling pipes and the lateral surface of the nozzle. With a small diameter of the mouths of the filling pipes, it is relatively easy to interrupt the product supply rapidly and accurately.

An elongated, hollow mandrel 20 of the male type is arranged in the nozzle coaxially with its lateral surface along the entire length of the nozzle, and a bevelled entry end 21 projects a short distance beyond the mouths of the filling pipes 18f. In the illustrative embodiment shown, the mandrel 20 has a circular cross section corresponding to the nominal circular inner cross section of the inner tube 11. This means that the inner tube is necessarily shaped to its nominal cross section when the filling nozzle 18 with its mandrel 20 is located in the double tube 10. The outer tube of the double tube lies with its inner side centered around the lateral surface of the filling nozzle and is shaped by the centring ring 19 to nominal circular cross section. In this way, a well-defined space intended for filling is created between the inner tube and the outer tube. In this space, the openings of the filling pipes 18f are in well-defined positions for filling the gap-shaped space without interference and deposit on the nozzle.

In order for this space to be well-defined throughout the filling step, it is ensured that the centering ring 19 maintains its position relative to the double tube throughout the filling step. The preferred position in the illustrative embodiment is a position around the open end portion of the double tube.

In the illustrative embodiment, the filling nozzle 18 is stationary in the machine frame, while the tube 10 is adjustable in the vertical direction.

It is thus a matter of synchronizing the movement of the tube holder 15 with the movement of the centering sleeve 12. In the illustrative embodiment, this is brought about by synchronized servo-driven units (not shown).

FIG. 3 shows the operations which make up a complete filling step for filling the gap-shaped space between the inner tube and the outer tube.

In position a, the advance of the conveyor 16 has been stopped. The tube holder 15 is in its transport position, the lifting device 17 is not in contact with the tube holder, and the centering sleeve 19 is in a position with a gap surrounding the dispensing end of the filling nozzle.

With the advance stopped, the lifting device 17 is then applied, and the open end of the double tube is centered externally by the centering sleeve 19 and internally by the mandrel 20, that is to say the outer tube is given a circular cross section by the centering sleeve, and the inner tube is necessarily shaped to a circular cross section on the mandrel 20. This takes place in step b.

In step c, the double tube has been lifted by the lifting device 17 to a position in which the mouths of the filling pipes 18f lie close to the tube shoulder and are positioned in an interference-free manner in the gap-shaped space between the inner tube and the outer tube. The centering sleeve 19 has been moved vertically upwards (by the servo unit, as has the tube holder) and maintains its relative position in relation to the open end of the double tube. The mandrel 20 lies inside the inner tube 11. Filling of the gap-shaped space can thus begin. During this process, the tube holder 15 and the centering sleeve 19 are drawn downwards (by their servo units) until the tube returns to the position in step b. Throughout this procedure, the centering sleeve 19 maintains its position relative to the double tube. In step d, filling of the gap-shaped space between the inner tube and the outer tube has been completed, and the tube holder 15 then returns to its transport position, as in step e.

It remains to fill the inner tube 11 with the product intended therefor. The double tube 10 is advanced to the next filling station. From the filling point of view, the inner tube 11 is in principle a conventional single tube, but with improved dimensional stability brought about by filling of the gap-shaped space, and can thus simply be filled by a filling nozzle intended for single tubes.

The present invention thus provides a tube-filling machine, and preferred processing method for the filling of double tubes have been described. In the description made with reference to the drawings, the principles underlying the present invention are shown on the one hand diagrammatically and on the other hand by specific embodiments of components.

Although the invention herein has been described with reference to particular embodiments, it is to be understood that these embodiments are merely illustrative of the principles and applications of the present invention. It is therefor to be understood that numerous modifications may be made to the illustrative embodiments and that other arrangements may be devised without departing from the spirit and scope of the present invention as defined by the appended claims.

What is claimed is:

1. A method for filling tubes having a first end having a delivery opening and a second end and including an inner tube, an outer tube separated from said inner tube by a predetermined gap, and a common tube shoulder at said first end of said tube connecting said inner tube to said outer tube for delivering product from said inner and outer tubes to said delivery opening, said method comprising delivering said tube to a tube filling station along a conveyor path, filling said predetermined gap at said tube filling station by means of an elongated nozzle including a plurality of filling pipes corresponding to said predetermined gap and a mandrel for insertion into said inner tube, said filling step comprising centering said outer tube with respect to said elongated nozzle by means of a centering sleeve disposed externally around said elongated nozzle to provide said outer tube with its nominal cross-sectional shape and centering said inner tube with respect to said elongated nozzle by means of said mandrel disposed within said inner tube to provide said inner tube with its nominal cross-sectional shape, positioning said elongated nozzle proximate to said common tube shoulder, filling said predetermined gap with said plurality of filling tubes while guiding said elongated nozzle out of said second end of said tube while retaining said centering sleeve around said elongated nozzle, and filling said inner tube.

2. The method of claim 1 including controlling relative movement between said elongated nozzle and said tube by supporting said elongated nozzle in a machine frame supporting a holder for vertical movement of said elongated nozzle and vertically moving said centering sleeve, and synchronizing said movement of said centering sleeve with said movement of said tube holder.

3. The method of claim 2 including positioning said plurality of filling pipes with essentially uniform spacing around the periphery of said mandrel.

4. The method of claim 1 wherein both said inner tube and said outer tube have a circular-cylindrical shape along the majority of the distance from said first end to said second end thereof.

5. Tube filling apparatus for filling tubes having a first end having a delivery opening and a second end and including an inner tube, an outer tube separated from said inner tube by a predetermined gap, and a common tube shoulder at said first end of said tube connecting said inner tube to said outer tube for delivering product from said inner and outer tubes to said delivery opening, said apparatus comprising a conveyor for delivering said tube to a filling station along a conveyor path, said filling station comprising an elongated nozzle for insertion into said predetermined gap, said elongated nozzle including a mandrel for insertion into said inner tube and a plurality of filling pipes for insertion into said predetermined gap, a centering sleeve disposed around said elongated nozzle, moving means for moving said tube with respect to said elongated nozzle, and holding means for maintaining said centering sleeve in position around said second end of said tube during relative movement between said tube and said elongated nozzle.

6. The apparatus of claim 5 wherein said moving means comprises a vertically movable tube holder, a stand supporting said moving means including servo controls, said elongated nozzle being supported in a positionally fixed manner in said stand, and said holding means comprising a servo driven unit synchronized with said servo controls.

7. The apparatus of claim 6 wherein said plurality of filling pipes are positioned essentially uniformly in a spaced array around the periphery of said mandrel.

8. The apparatus of claim 7 wherein said elongated nozzle is substantially circular-cylindrical, and said plurality of filling pipes lie within said lateral surface of said elongated nozzle, said mandrel being essentially cylindrical and including a conical entry end.

* * * * *